United States Patent [19]

Nunn

[11] Patent Number: 4,850,217
[45] Date of Patent: Jul. 25, 1989

[54] ADAPTIVE PROCESS CONTROL FOR INJECTION MOLDING
[75] Inventor: Robert E. Nunn, Londonderry, N.H.
[73] Assignee: HPM Corporation, Mount Gilead, Ohio
[21] Appl. No.: 258,652
[22] Filed: Oct. 17, 1988

Related U.S. Application Data

[62] Division of Ser. No. 180,487, Apr. 12, 1988, Pat. No. 4,816,197.

[51] Int. Cl.⁴ ............................................. G01N 11/04
[52] U.S. Cl. ........................................................... 73/56
[58] Field of Search ....................................... 73/55, 56

[56] References Cited

U.S. PATENT DOCUMENTS

| | | | |
|---|---|---|---|
| 3,508,434 | 4/1970 | Heinle et al. | 73/56 |
| 3,695,800 | 10/1972 | Hutchinson et al. | 425/146 |
| 3,721,512 | 3/1973 | Ma et al. | 425/149 |
| 3,741,700 | 6/1973 | Hutchinson et al. | 425/159 |
| 3,893,792 | 7/1975 | Laczko | 425/149 |
| 3,937,776 | 2/1976 | Hold et al. | 264/40 |
| 3,941,534 | 3/1976 | Hunkar | 425/145 |
| 4,102,958 | 7/1978 | Wertz | 425/144 |
| 4,161,380 | 7/1979 | Bishop | 425/145 |
| 4,208,176 | 6/1980 | Salerno | 425/144 |
| 4,326,255 | 4/1982 | Fujita | 364/476 |
| 4,333,336 | 6/1982 | Myerholtz et al. | 73/56 |
| 4,541,270 | 9/1985 | Hanslik | 73/56 |

FOREIGN PATENT DOCUMENTS

| | | | |
|---|---|---|---|
| 3608973 | 9/1987 | Fed. Rep. of Germany . | |
| 169848 | 6/1965 | U.S.S.R. | 73/56 |
| 188121 | 11/1966 | U.S.S.R. | 73/56 |
| 444968 | 12/1974 | U.S.S.R. | 73/56 |

OTHER PUBLICATIONS

*Society of Plastics Engineers—Pittsburg Section,* "Injection Molding—The Next Five Years", Author: Wolfgang Meyer, Nov. 1985.
*Plastics Technology,* Nov., 1985, p. 25, "PVT Holding-Pressure Control: Here's What It Can Do for You".

*Primary Examiner*—Stewart J. Levy
*Assistant Examiner*—Joseph W. Roskos
*Attorney, Agent, or Firm*—Jeffers, Hoffman & Niewyk

[57] ABSTRACT

An injection molding machine is utilized to develop PVT constants for a given material by pressurizing the material in the barrel against the blocked outlet nozzle, measuring the volume during pressurization, and then weighing the pressurized shot after it is purged from the barrel in order to calculate the specific volume of the material. Plotting specific volume against a variety of pressure and temperature values produces a plot of PVT relationships from which the constants can be derived.

2 Claims, 4 Drawing Sheets

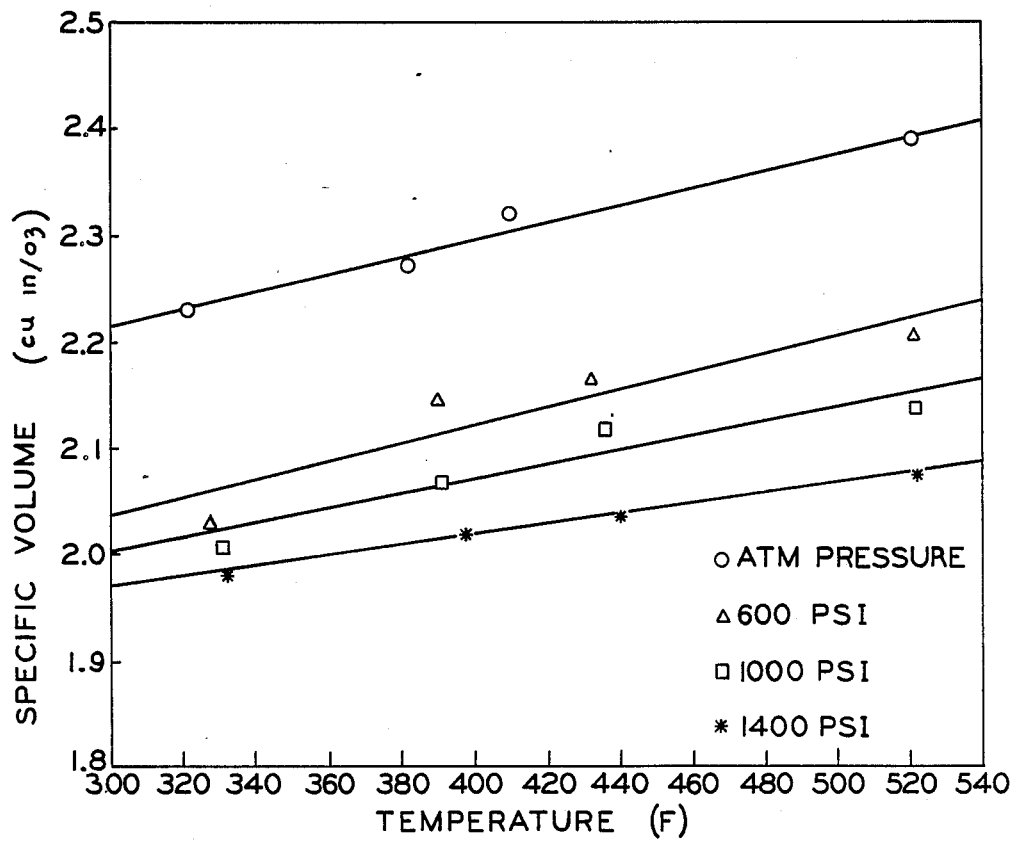

ADAPTIVE PROCESS CONTROL FOR INJECTION MOLDING

This is a division of application Ser. No. 180,487, filed Apr. 12, 1988, now U.S. Pat. No. 4,816,197.

BACKGROUND OF THE INVENTION

The present invention relates to a method for implementing PVT control of an injection molding operation wherein the pack time and hold time are dynamically adjusted based on sensing parameters related to melt temperature.

In an injection molding process, solid polymer is melted typically in a rotating screw injection unit, forced into a closed mold in which it solidifies, thereby assuming the geometry of the mold cavity. Although this process at first appears to be simple, in practice, an experienced molder knows that the successful application of the process is critically dependent on a very elusive complex of interrelated dimensions: mass, time, pressure and temperature. A change in any one of these machine parameters modifies one or more of the other dimensions and results in changes in the molded article.

Process engineers are well aware that variability and operating parameters during injection will result in changes in the molded article. A very significant parameter is the temperature of the melt during injection, which affects the density of the molded parts. In the injection molding process, once the mold is completely filled, additional plasticized material is packed into the mold by continuing to exert injection pressure until the gate freezes. Accordingly, if there is a higher melt temperature but the same amount of packing pressure, the density of the material will be lower because there will be less mass in the mold. Accordingly, in order to pack more material into the mold at higher melt temperatures, packing must occur at a higher pressure or the pressure profile must be for a longer period of time in order to ensure that the mold is filled properly.

If the amount of material packed into the mold changes during a run, different size parts will result at atmospheric pressure when the part has cooled to room temperature. This is highly undesirable in most cases, because a part that is too dense will consume more raw material, and if the density is not according to specification, the performance of the part may be unacceptable.

Although the variability in operating parameters results in changes in the molded article, it is often not apparent, without the advantage of extensive testing, just how much the part has changed in response to a given parametric variation. To achieve a desired part characteristic, the determination of the number of relevant parameters requiring adjustment, as well as the correct direction and amplitude of adjustment, is an art currently practiced with difficulty.

The objective of all process controls is the optimization of the molded part in accordance with certain set-up specifications. Currently, three main categories of injection molding control systems are in use: open loop, close loop and adaptive control. Adaptive control processing, which is the newest category of control systems, is a sophisticated approach to injection molding process management in which predetermined set points are "intelligently" modified, based on variations in process parameters. PVT (pressure, specific volume and temperature) optimization is probably the most sophisticated process control system developed for injection molding to date. However, a practical disadvantage of such an approach is the necessity for accurate melt temperature mesurements in order to profile holding pressure and cooling time.

The manner in which pressure, volume and temperature are interrelated and the various phases through which a shot of resin goes during an injection molding cycle incorporating PVT holding pressure optimization are represented schematically in the tear drop-shaped PVT diagram shown in FIG. 2. The PVT optimization routine, which is described in the literature, is concerned with pressure, specific volume and temperature as well as the mean temperature profile in the mold, as determined by a cooling calculation. In the diagram of FIG. 2, pressure values are represented by diagonal isobar lines 10 wherein the uppermost line is at atmospheric pressure and the lines below it indicate successively higher pressures. Specific volume is defined as the volume of plastic per unit weight and is the inverse of its density. The objective of PVT control is to return the molded parts to the same temperature at atmospheric pressure after cooling, which assures that the specific volume, and, therefore, the density and part weight, will be consistent. In other words, the temperature and specific volume of the material starts at point 12 on the diagram of FIG. 2, is plasticized, injected and cooled and returns to the influence of PVT optimization to the same atmospheric isobar, at which point it cools down to room temperature at point 12 on the diagram.

During injection when the mold is being filled, which is represented by line 14 on the tear shaped curve, the mold is being filled and the material is pressurized, which results in the material remaining essentially at the same temperature, which results in generally a vertical drop in specific volume until point 16 is reached, at which point the pressure is established. At this point, the mold is filled and the system then switches over to a holding pressure to provide holding or packing of the material in the mold, and this is represented by line 18 on the diagram of FIG. 2. It will be noted at this point, the curve moves down along the same isobar to point 20, at which point the gate freezes so that whatever mass of material was packed into the mold at that point is the final fill quantity of the mold.

At this point, temperature decreases because the mold is completely filled and the specific volume is nearly constant as the curve moves to the left back to point 22, which is atmospheric pressure.

If the melt is at a higher temperature following plasticating, this changes the position of line 14 on the diagram of FIG. 2, essentially moving that line 14 to the right. This also changes the location of point 16, which must be on the same pressure isobar, but will result in greater specific volume for the shot. In order to pack and hold the shot and return to point 22, a longer cooling time will be necessary because there is a greater temperature differential between point 16 and point 22. If this is done, then the specific volume of the shot will be the same as in the previous shot and the part density will be uniform.

The PVT optimization control system is based upon physical data from molded parts judged to be optimum, and the desired specific volume at atmospheric pressure must be predetermined. Present PVT optimization systems require thermocouples in both halves of the mold, a cavity pressure transducer and melt temperature sensor in the nozzle region. Maximum cavity pressure is user-selected to minimize the possibility of mold flashing or damage. The holding time may be calculated using a cooling equation, such as the Ballman and Shusman formula:

$$t_c = (S^2/\pi^2 a) \ln [8(T_M - T_m/\pi^2(T_E - T_m)]$$

wherein:
$T_M$ = Melt Temperature
$T_m$ = Mold Temperature
s = Part Thickness
$T_e$ = Temperature at Injection
a = Thermal Diffusivity
$t_c$ = Cooling Time As is evident, cooling time is a function of mold and melt temperatures, part geometry and material thermal characteristics.

A significant problem with the classical PVT approach to injection molding process control arises from the requirement for continuous melt temperature monitoring. The holding pressure profile is continuously adjusted in accordance with changes in melt temperature, and the temperature sensors, which are located in the nozzle or in the front of the barrel, are subjected to very high pressures and temperatures. Radiant temperature monitoring devices are very susceptible to abuse in the normal molding environment, and under manufacturing conditions, precision monitoring of melt temperature in the nozzle ranges from difficult to impractical. Although PVT process control has proven quite successful in achieving uniform part density, the high cost, maintenance problems and short life of melt temperature sensors have severely limited its commercial viability.

SUMMARY OF THE INVENTION

The method according to the present invention controls certain parameters of an injection molding machine cycle applying PVT optimization, namely, the holding time and cooling time, without the necessity for utilizing mold or melt temperature sensors. The molding cycle comprises plasticating a material by means of a rotating screw, injecting a shot of the plasticated material into a closed mold by axially advancing the screw, applying holding pressure on the material in the mold for a holding period, permitting the molded part to cool in the mold and then opening the mold at the end of the cooling period. The method of the present invention comprises performing at least one qualifying molding cycle to produce a part having acceptable quality. In the qualifying cycle, the injection velocity and injection pressure are measured at at least one selected axial position of the screw during injection. Preferably, the injection velocity and injection pressures are measured at a plurality of positions of the screw. The average viscosity of the plasticated material is calculated as a function of the measured injection velocity and pressure. Then, a subsequent molding cycle is performed and the injection velocities and injection pressures are again measured at the same screw positions in the second cycle. The average viscosity of the plasticated material in the second cycle is calculated as a function of the measured injection velocities and pressures, and the holding time and cooling time in the second cycle are adjusted in relation to the holding and cooling times in the qualifying cycle in proportion to the ratio of the average calculated viscosities in the qualifying and subsequent cycle.

In a preferred form of the invention, the average viscosities are calculated for each cycle and are then compared to the average viscosity in an earlier cycle, such as the immediately proceeding cycle, to obtain the viscosity ratio, which is then used to adjust the holding and cooling periods.

In accordance with a further aspect, a method is provided for determining PVT constants of a thermoplastic material in an injection molding machine. The injection outlet of the molding machine barrel is blocked and a shot of material is plasticated in the barrel and then pressurized in the barrel at a certain temperature and pressure by axially advancing the screw toward the blocked outlet. The volume of the pressurized shot is then measured by mesuring the axial position of the screw. The pressurized shot is then purged and the purged shot is weighed. The specific volume of the material is calculated as the ratio of the volume of the shot divided by its weight. These steps are then repeated for a plurality of different temperatures and pressures. The specific volumes are assembled as a function of temperature and pressure, preferably by preparing a plurality of plots of specific volume values as a function of temperature along pressure isobars.

BRIEF DESCRIPTION OF THE DRAWINGS

FIG. 5 is a diagram showing the PVT relationship for linear low density polyethylene.

DETAILED DESCRIPTION

Melt Temperature Determination

Figure 1:
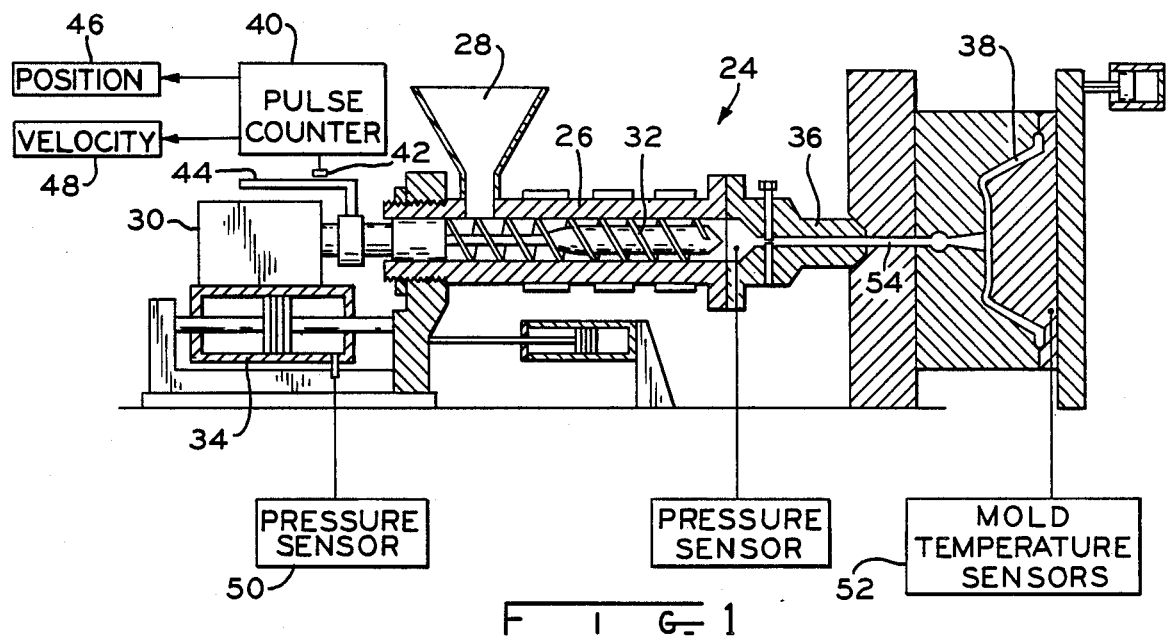
FIG. 1 is a diagrammatic view of an injection molding machine equipped with sensors to be used in the practice of the method according to the present invention.

As indicated earlier, accurate and rapid melt temperature measurements are difficult to acquire directly from the melt, although this data is fundamental to the PVT process control method. In accordance with the present invention, the change in melt temperature is detected by an associated change in melt viscosity, and the ratio of viscosity from one cycle to another is utilized to adjust the packing and holding times for the molded part. Viscosity as a function of temperature is described by the Arrhenius Equation:

$$U = U_0 \exp (E/RT)$$

wherein:
U = Viscosity at any Temperature
$U_0$ = Reference Viscosity
E = Activation Energy
R = Gas Constant
T = Temperature Taking the natural logarithm of both sides of the equation:

$$\mathrm{Ln} U = \mathrm{Ln}\ U_0 + (E/RT)$$

The plot of Ln U versus 1/T yields a slope which equals E/R, a material constant. Consider now two molding cycles with respective melt temperatures $T_1$ and $T_2$.

Let $E/R = E'$

Cycle 1: $Ln\ U_1 = Ln\ U_0 + [E'/T_1]$

Cycle 2: $Ln\ U_2 = Ln\ U_0 + E'/T_2$ $Ln\ U_1 - Ln\ U_2 = E'[1/T_1 - 1/T_2]$ $Ln\ [U_1/U_2] = E'[1/T_1 - 1/T_2]$ Taking the viscosity ratio of the two cycles:

$U_2/U_1 = \exp[-E(T_2-T_1)/(RT_2T_1)]$

Isolating $T_2$:

$T_2 = T_1/[1+(R/E)Ln(U_2/U_1)]$

The immediately preceding equation indicates that a change in melt temperature ($T_2$) may be calculated from a change in viscosity.

The initial task in determining a change in melt temperature is the calculation of the associated change in the viscosity. A mathematical model developed below, relating viscosity and primary process parameters, facilitates calculations of viscosity. Resin flow can be modeled by the equation:

$Q = (P/U) \times K$ where:
Q = vol. flow rate (cu in/sec)
P = pressure (psi)
U = resin visc. (lbf sec/in sq.)
K = die constant (cu in)
Or, rearranging:

$U = (P/Q) \times K$

Over a period of time, t, an average "injection" viscosity may be defined by:

$U\ avg = 1/t \times$ integral of $[K(P/Q)\ dt]$

In principle, this equation would be used to monitor a change in viscosity from cycle to cycle. If the mold cross-sectional area is constant throughout ($dK/dx = 0$), the viscosity would be independent of mold geometry. An average viscosity could then be readily determined using equation 12. However, most mold cavities are not that simple, and provisions must be made for the more complex geometries typically encountered.

An approach is to consider successive shots, each of which is divided into small increments. In the following analysis, the first subscript refers to the shot, while the second subscript refers to the increments.

Shot 1:

increment 1 $U_{1,1} = (P_{1,1}/Q_{1,1}) \times K_1$ increment 2 $U_{1,2} = (P_{1,2}/Q_{1,2}) \times K_2$ increment 3 $U_{1,3} = (P_{1,3}/Q_{1,3}) \times K_3$ increment n $U_{1,n} = (P_{1,n}/Q_{1,n}) \times K_n$ Note that the mold constant K, has only one subscript, while pressure and flow rate have two. The flow resistance varies solely as a function of position within the mold cavity.

Consider now, the following shot at the same position, so that the mold constants K, are the same as in shot 1:

Shot 2:

increment 1 $U_{2,1} = (P_{2,1}/Q_{2,1}) \times K_1$ increment 2 $U_{2,2} = (P_{2,2}/Q_{2,2}) \times K_2$ increment 3 $U_{2,3} = (P_{2,3}/Q_{2,3}) \times K_3$ increment n $U_{2,n} = (P_{2,n}/Q_{2,n}) \times K_n$ Examining the ratio of two consecutive shots, at any position, j, it can be stated that:

$U_{2,j}/U_{1,j} = [(P_{2,j}/Q_{2,j})/(P_{1,j}/Q_{1,j})]$

By measuring pressure and flow rate measurements at exactly the some cavity location in both shots, viscosity dependence on mold constants is eliminated. Viscosity is now a function only of pressure and flow rate. Note that the volumetric flow rate Q, is related to screw velocity and cross-sectional area of the injection barrel bore as:

$Q = V \times A$

Where:
V = screw velocity
A = cross-section area of barrel bore

The barrel bore on an injection molding machine is of constant cross-sectional area; therefore, volumetric flow rate is directly proportional to screw velocity. Viscosity can then be calculated by the measurement of two primary process parameters: pressure and screw velocity. The viscosity ratio ($U_2/U_1$), calculated above, can now be directly substituted into the equation:

$T_2 = T_1[1+(R/E)Ln(U_2/U_1)]$ to determine the temperature of the second shot, T2. In order to reduce data scatter, an average viscosity ratio can be defined as:

$U_2/U_1 = 1/n\ SUM[(P_{2,j}/Q_{2,j})/(P_{1,j}/Q_{1,j})]$

Starting from a measured reference temperature, all subsequent changes in melt temperature can be calculated by monitoring pressure and screw velocity, at prescribed increments of ram position, as the melt front advances within the cavity. This change can now be used to modify the set-point for pack and hold time by scaling through the Ballman Shusman cooling formula set forth above.

Process Control

The method of process control according to the present invention is primarily adaptable for implementation with an injection molding machine utilizing a reciprocating screw, such as the injection molding machine 24 shown in FIG. 1. Injection molding machine 24 comprises a barrel 26 having a feed hopper 28, a hydraulic motor 30 for rotating screw 32 and a hydraulic injection unit 34 for advancing screw 32 to inject molten plastic through nozzle 36 into mold cavity 38.

In order to practive the method of the present invention, instrumentation to monitor the position of the injection screw 32 during injection, means to monitor the velocity of the screw 32 and means to measure the hydraulic pressure in the injection hydraulic cylinder 34 during injection are provided. In order to monitor the position of screw 32, a conventional pulse counter mechanism 40 having a sensor 42 that detects the passage of marks on arm 44 connected to screw 32. Pulse counter 40 provides a position readout on display 46 that is a function of the number of pulses counted, and provides a velocity output on display 48, which is a function of the number pulses counted per unit of time. Pressure of the hydraulic ram 34 is detected by pressure sensor 50. Pressure sensor 50, position indicator 46 and velocity indicator 48 may provide visual outputs or may be connected to a microprocessor or conventional machine controller (not shown). With regard to the velocity of screw 32 during injection, it should be noted that the velocity at any instant is related to the volumetric flow rate in the cross-sectional area of the barrel bore, the volumetric flow rate being the product of the velocity and barrel bore cross-sectional area.

Prior toimplementing the PVT process control procedure, the machine must be adjusted by the operator to produce parts of desired quality. This procedure follows normal molding practice with the operator adjusting machine parameters, such as positions, pressures and speeds, until the desired part quality is achieved. Temperature sensors may be used to determine the temperature of the plastic melt if such temperature monitoring is necessary during the set-up procedure to assist in producing parts of acceptable quality. The temperature $T_{M,1}$ of the plastic melt, prior to injection, is measured for example by making an air shot into an insulated container and using a pyrometer or similar device to measure the temperature of the molten plastic. This value is retained for reference, and also can be entered and stored in the machine controller. Furthermore, the average thickness s of the part to be produced is retained for reference and/or stored in the machine controller. Also prior to implementing the process control procedure, the mold surface temperature $T_m$ is measured by mold temperature sensor 52 and is retained and/or stored in the machine controller. This can be directly measured by using a surface pyrometer or by monitoring thermocouples placed in the mold in close proximity to the mold cavity. Alternatively, the monitored temperature of the heat temperature fluid used to control mold temperature can be used as a substitute.

Figure 3:
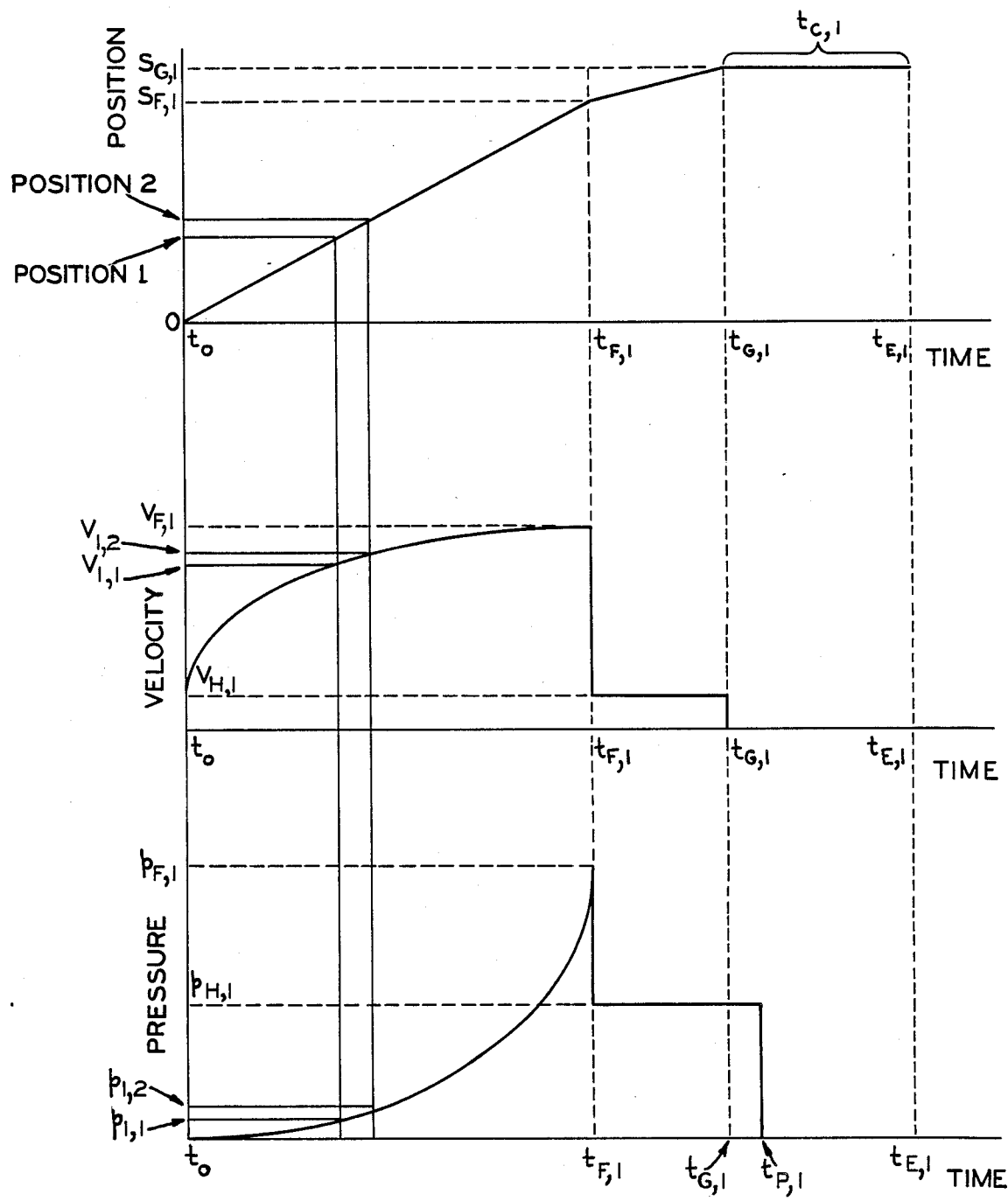
FIG. 3 is a schematic diagram showing the variation of RAM position with time, ram velocity with time and hydraulic pressure with time during the injection portion of a qualifying cycle.
Figure 4:
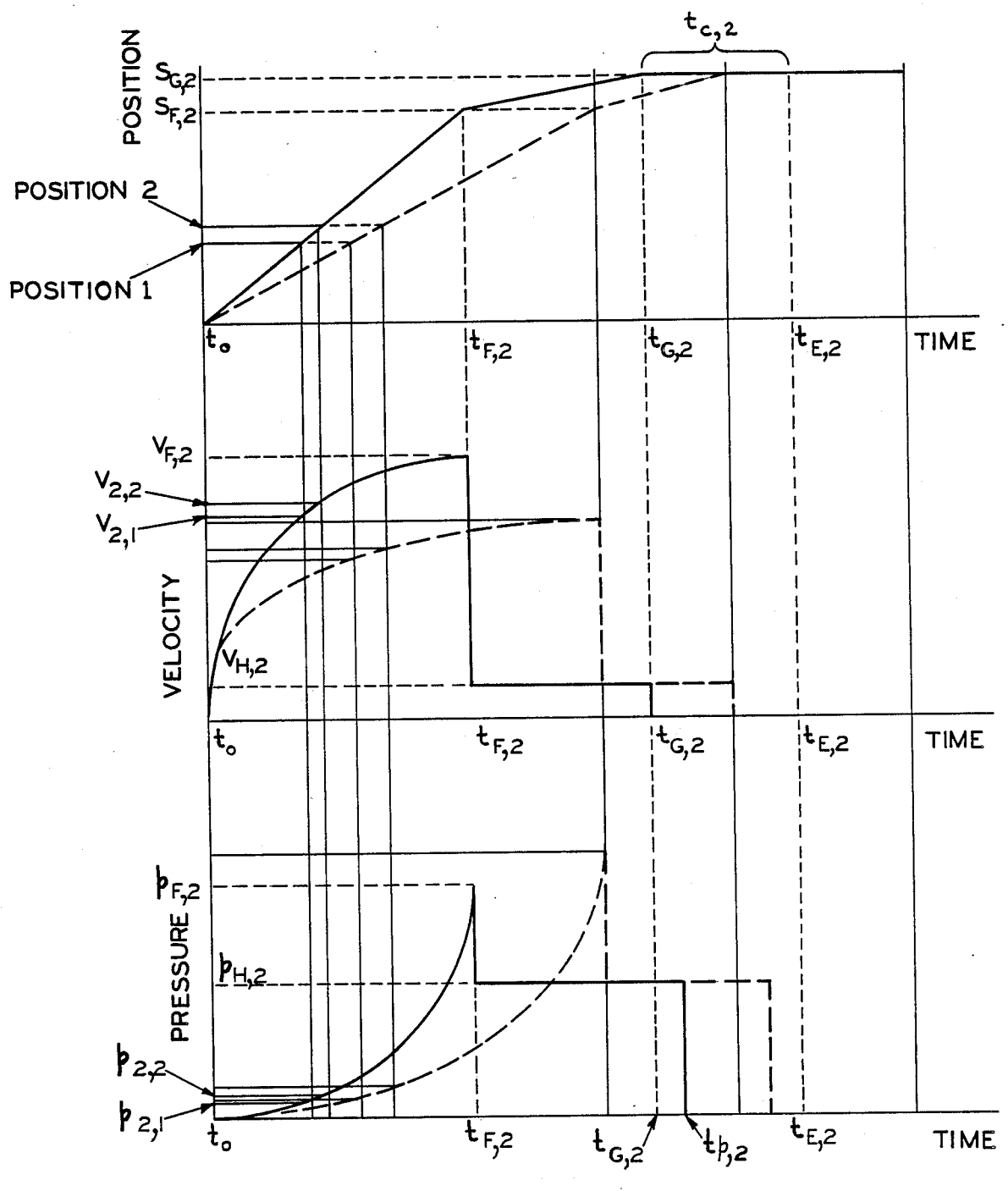
FIG. 4 is a schematic diagram of the variation of ram position with time, ram velocity with time and hydraulic pressure with time for a cycle run, wherein the curves of FIG. 3 have been superimposed in dotted line.

Once an acceptable part has been produced, which means that the machine parameters have been properly adjusted, a qualifying machine cycle is run to generate additional reference data. FIG. 3 illustrates schematically the variation of ram position with time, ram velocity with time and hydraulic pressure with time during the injection portion of the qualifying cycle. The time scales in each plot are the same and the injection process can be described in terms of these plots in the following manner. the origin of the plots, i.e., at the time $t_0$ *is the start of an injection. The injection ram 34 is at its rearward position, from which subsequent displacements are referenced, the ram is stationary and there is yet no pressure in the injection cylinder. At the start of injection, hydraulic fluid is pumped into the injection cylinder 34 causing the pressure to rise and the screw 32 to move forward, thereby injecting molten plastic into mold 38. The hydraulic pressure, ram velocity and resulting ram displacement are plotted while the mold cavity is filling, between time $t_0$ and time $t_{F,1}$.*

During the filling stage, some reference data are recorded which will later be used when the control method is applied. At an appropriate RAM position, shown in FIG. 1 as position 1, the velocity of screw 32 $V_{1,1}$ and the pressure $p_{1,1}$ in the injection cylinder 34 are monitored. Position 1 is likely to be in the first 50% of the filling stroke $S_F$, although it may also occur within the final 50% of the filling stroke in some machines. The pressure value $p_{1,1}$ is divided by the velocity value $V_{1,1}$ and the resulting quotient $(p_{1,1}/V_{1,1})$ is stored in the machine controller. The quotient can be shown to relate to the melt viscosity $U_{1,1}$ at that instant according to:

$$U_{1,1} = C_1(p_{1,1}/V_{1,1})$$

wherein $C_1$ is a constant involving geometrical factors regarding mold geometry.

At a second position of the ram, shown as position 2, close to position 1, the velocity of screw 32 $V_{1,2}$ and the pressure $p_{1,2}$ are monitored, their quotient is evaluated and stored in the controller. The quotient can be shown to relate to the melt viscosity $U_{1,2}$ at that instant according to:

$$U_{1,2} = C_2(p_{1,2}/V_{1,2})$$

wherein $C_2$ is a constant involving geometrical factors.

This procedure of monitoring ram velocity and injection cylinder pressure, evaluating and storing teh quotient is repeated at several other positions during the filling stage. In practice, the number of positions at which this procedure is carried out and the actual positions themselves may be user-selectable in practice. Alternatively, the controller may retain preprogrammed values in memory which may or may not be user adjustable.

At time $t_{F,1}$, mold cavity 38 becomes filled with plastic, and at this instant, the displacement of screw 32 is $S_{F,1}$, its velocity is $V_{F,1}$ and the pressure in the injection cylinder is $p_{F,1}$. Typically, $V_{F,1}$ and $p_{F,1}$ are large in magnitude. At this instant, a holding timer and a colling timer simultaneously begin timing. Although the method would typically be carried out with a machine having a conventional machine controller having such timers, the process could also be performed manually with the operator setting the various times. The holding time $t_{H,1}$ and the cooling time $t_{C,1}$ are set by the operator. The holding timer will be used to signal the end of pressure holding, and the cooling timer will signal the end of cooling.

The requirements of the injection molding process are such that once the cavity is filled, a holding pressure is maintained in the injection cylinder to pack additional plastic into the mold as the contents of the cavity cool and contract. At time $t_{F,1}$, FIG. 3 illustrates the change to a pressure holding mode. The holding pressure may be of constant magnitude, as shown in FIG. 3, or may be varied with time, for example, linearly decreasing, decreasing step-wise or decreasing in continuous but non-linear fashion. Normally, the holding hydraulic pressure $p_{H,1}$, is less than the hydraulic pressure at the point of complete cavity fill. Also, the velocity of the ram during holding $V_{H,1}$ is normally less than the velocity at the point of cavity fill $V_{F,1}$. The velocity change is also evident in a change in the gradient of the position plot.

Dring the pressure holding stage the material in mold cavity 38 cools, and additional plastic is forced through the mold gate 54 into cavity 38 to compensate for material shrinkage. During the holding period, the material in the gate cools to solidification temperature and thus solidifies. The now solid material in the gate prevents any additional molten plastic from being injected into the mold. Thus, the action of the gate freezing off effectively isolates the cavity, and the amount of plastic in cavity 38 will be the mass of the molded product. The point of gate freeze as shown in FIG. 1 at time $t_{G,1}$, and beyond this point, the velocity of screw 32 will be essentially zero, since no additional material can be forced into the cavity. In FIG. 3, the ram velocity is shown as 0 and the ram displacement remains at $S_{G,1}$.

The holding period continues somewhat beyond tiem $t_{G,1}$ to time $t_{p,1}$ to ensure that holding pressure will be maintained until the gate is frozen. When the holding timer times out the holding hydraulic pressurein the injection cylinder 34 is relieved. In conventional molding practice, an experienced operator adjusts both the holding time $t_{H,1}$, which is numerically equal to the distance between the time at which pressure is relieved $t_{p,1}$ at the time at which holding began $t_{F,1}$, and sets the pressure set point $p_{H,1}$ in an empirical or experience-based fashion until adequate part quality is achieved.

The cooling period continues after the holding period has ended since additional time is necessary for the molded product to achieve an adequate temperature for the mold to open and the part to be ejected. Again, an experienced operator adjusts the cooling timer setting $t_{C,1}$ in an empirical fashion until adequate part quality is achieved. The cooling time is numerically equal to the difference between the time at which the mold is opened or part ejection $t_{E,1}$ and the time at which cooling began $t_{F,1}$.

Alternatively, a mathemtical model of the cooling process may be used, for example in the form of a program in the memory of a digital computer, to predict the holding time necessary to achieve a desired average part temperature $T_{E,1}$ at which ejection is required. Such cooling analyses are well-known, and involve knowledge of the plastic temperature $T_{M,1}$, at the start of cooling, the temperature of the mold surface $T_m$ during cooling, the average part thickness s and the thermal diffusivity of the molten plastic a, which is a material property which may be established experimentally or in many places found in published literature. With this knowledge, for example, one such well-known model predicts the cooling time as:

$$t_c = (s^2/\pi^2 a) \ln[8(T_m - T_m)/\pi^2(T_E - T_m)]$$

A practical difficulty in using such an analysis in a process control context is that the optimum ejection temperature is very difficult to predict, unless extensive analysis is performed and consequently, an arbitrary value is usually selected. For the qualifying run, it is assumed that the cooling time $t_{C,1}$ is selected by an experienced operator and its value stored in the controller. It should be noted that the selected cooling time $t_{C,1}$ may be used in the above equation to calculate a value of ejection temperature $T_{E,1}$ according to the current molding conditions, if so desired.

Figure 2:
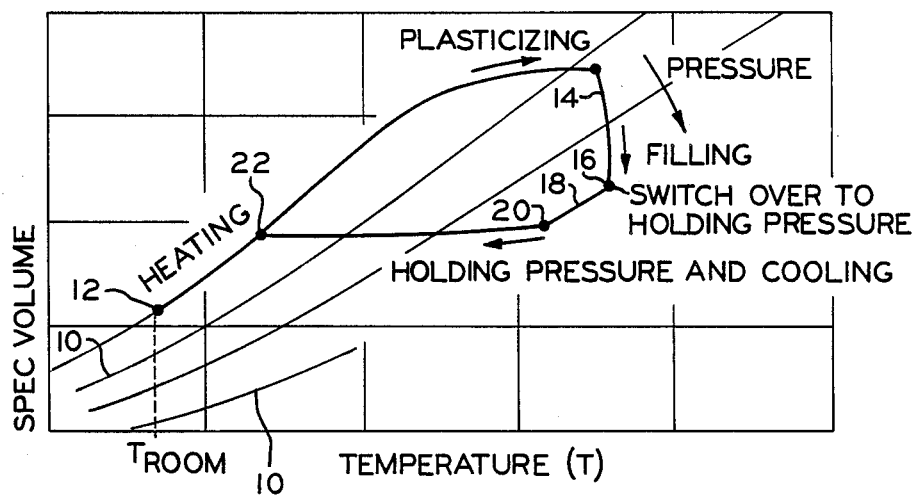
FIG. 2 is a diagrammatic view showing the temperature, pressure and specific volume parameters of an injection molding shot.

The machine is now properly set up and the qualifying run data has been noted and stored, and the process control method is now applied to subsequent molding cycles as set forth hereinafter. The plots of ram position, ram velocity and ejection pressure versus time for the first cycle run after the qualifying cycle run are set forth in FIG. 2. For comparison purposes, the equivalent plot generated during the qualifying cycle are shown in dotted line in FIG. 2. To illustrate the operation of the method, it is assumed that the melt temperature of the molten plastic during ejection has changed since the qualifying shot, and as a result, the new position, velocity and pressure plots are different from those in the qualifying cycle shown in FIG. 3. The differences result in new values of fill time $t_{F,2}$ gate seal time $t_{G,2}$, holding time $t_{P,2}$, ejection time $t_{E,2}$, fill position $S_{F,2}$, gate seal position $S_{G,2}$, fill velocity $V_{F,2}$, holding velocity $V_{H,2}$ and fill pressure $p_{F,2}$ as shown. The changes in fill position and gate and seal position are due to the change in melt density of the plastic due to the change in melt temperature. These changes can be calculated from the equation of state of material, which is of the form:

$$(p+\pi)(v-\beta) = RT$$

Wherein:
P = melt pressure
$\pi$ = a material constant
v = melt specific volume
$\beta$ = a material constant
R = universal gas constant
T = melt temperature Some of the changes in time, velocity and pressure are a result of changes in the melt viscosity due to the change in melt temperature, since changes in viscosity change the fluid dynamics of the filling and holding portions of the operation. Other changes result from changes in cooling rates which result from change in melt temperature.

A holding pressure, $p_{H,2}$ different in magnitude than previously used during the qualifying run, may also be applied. An appropriate value of $p_{H,2}$ might, for example, be calculated from the equation of state of material, although the situation where the value was not changed is also covered by the method of the present invention. During the filling portion, at the identical position 1 used previously, ram velocity $V_{2,1}$ and injection pressures $p_{2,1}$ are monitored, and their quotient $(p_{2,1}/V_{2,1})$ stored, the latter being related to the new melt viscosity $U_{2,1}$ at that instant according to:

$$U_{2,1} = C_1(p_{2,1}/V_{2,1})$$

wherein: $C_1$ is the same constant as previously used. Dividing the quotient $(p_{2,1}/V_{2,1})$ for position 1 for the current cycle by that obtained on the previous cycle $(p_{1,1}/V_{1,1})$ provides the ratio of the viscosity at the current instant $U_{2,1}$ to that at the corresponding instant in the previous cycle $U_{1,1}$ according to:

$$U_{1,1}/U_{2,1} = (p_{1,1}/V_{1,1})/(p_{2,1}/V_{2,1})$$

Similarly, at the identical point 2 used previously, the ram velocity $V_{2,2}$ and injection pressure $p_{2,2}$ are monitored and their quotient $(p_{2,2}/V_{2,2})$ stored, the latter relating to the new melt viscosity $U_{2,2}$ at that instant according to: $U_{2,2} = C_2(p_{2,2}/V_{2,2})$ wherein $C_2$ is the same constant as previously. Dividing the quotient $(p_{2,2}/V_{2,2})$ for position 2 for the current cycle by that obtained on the previous cycle provides the ratio of the viscosity at the current instant $U_{2,2}$ to that at the corresponding instant in the previous cycle according to:

$$U_{1,2}/U_{2,2}=(p_{1,2}/V_{1,2})/(p_{2,2}/V_{2,2}).$$

This procedure for establishing viscosity ratios is repeated for all points in the current cycle that correspond with the points used previously.

From all the viscosity ratios thus obtained, an average viscosity ratio can be calculated, and this average viscosity ratio can then be used to calculate the increment $\Delta T$ by which the current average melt temperature $T_{M,2}$ has changed from the value in the previous cycle $T_{M,1}$ according to:

$$\Delta T = \ln(U_1/U_2)/(E'/T_{M,1}^2)$$

Where
$\Delta T = T_{M,2} - T_{M,1}$ $E' = E/R$
$E$ = activation energy (a material constant)
$R$ = universal gas constant Consequently, this increment can be added to the value of melt temperature stored in the controller, i.e., $T_{M,1}$ to give the new melt temperature $T_{M,2}$ which is stored.

The viscosity ratio $U_1/U_2$ can be used to calculate an increment of time $\Delta t$ which when added to the holding time of the previous cycle $t_{H,1}$, gives the optimum holding time for the current cycle $t_{H,2}$, which is calculated and stored and used to determine the duration of the holding phase for the current cycle. The addition of this increment reflects the change in time necessary to achieve gate freeze-off. The increment is also added to the cooling time used on the previous cycle $t_{C,1}$ to give the optimum cooling time for the current cycle $t_{C,2}$, which is calculated and stored and used to determine the duration of the cooling period for the current cycle. The addition of this increment reflects the change in time necessary to cool the plastic and the increment $\Delta t$ is calculated according to:

$$\Delta t = s^2 T_{M,2}^2 / [\pi^2 aE'(T_{M,2} - T_m)] \ln(U_1/U_2)$$

The group of variables $T_{M,2}^2/[\pi^2 aE'(T_{M,2}-T_m)]$ can be called the "viscosity-cooling group", and its value can be approximated for eachr esin family by using generic values for the variables, these values stored in the controller in the data bank, and these approximate constant generic values used for control calculations. Alternatively, a specific value can be established during the set-up period, using actually monitored melt and mold temperatures, and this constant value used for control. A third method is to calculate a specific value during the set-up period and modify it continually cycle to cycle as melt tempertaure changes as part of the control process.

For subsequent molding cycles, the same control procedure as just detailed above will followed. ram velocity and pressure will be monitored at the appropriate points and viscosity ratios calculated relating the prior cycle with the current cycle. The melt temperature value in memory is updated each cycle, as is holding time and cooling time. The monitoring and calculation can be done manually by an operator reading meter outputs and then performing the calculations using a small hand-held calculator or computer. Alternatively, the data can be entered into the machine controller or into a separate computer, which would automatically store the values, peform the viscosity ratio calculation and update the holding and cooling times on eaach cycle.

By providing optimum holding and cooling times, possibly in conjunction with modified holding pressures calculated from the equation of state, consistency of the molded product is improved in comparison with machine operation not utilizing the proposed method. A variation of the above method is, instead of using an initial value of mold temperature $T_m$ in the necessary calculations, is to monitor the mold temperature continuously and use the current monitor value in the calculations, for even greater consistency. Another variation is that only the cooling time set point is changed and not the holding time set point. In this case, a sufficiently long holding time is used to ensure that the holding pressure is always maintained beyond the expected cycletwo-cycle variation of gate freeze time.

CONSTANTS FOR EQUATION OF STATE

In order to implement PVT control, pressure, specific volume and temperature interrelationships must be specified for any given material. Utilization for these parametric relationships is limited by the availability of data in the literature and while data for selected resins are available, they may not be as accurate as desired in some cases. Commonly used additives such as colorants, lubricants, plasticizers, stabilizers and fillers may alter PVT relationships to some extent. Since published data for polymer PVT relationships are not exhaustive, it is advantageous if these data could be reliably generated for any given material.

The injection unit of the molding machine 24 may be thought of as a pressurizing chamber. The PT characteristics of a polymeric material system can be determined by outfitting of the nozzle with an accurate temperature sensor and pressure transducer, as well as the screw with the precise linear position transducer. The advantages of generating PVT data on the injection molding machine, rather than with laboratory instrumentation such as the mercury piezometer are self-evident. A key advantage results from the measurement of the melt under actual molding conditions. Also, material-specific data reduces the approximation encountered in utilizing generic data for the equation of state. Although PVT data generation on the machine is restricted to mesurements within the materials' molten state, this is the primary area of interest to the processor. Upper and lower temperature range limits are defined by the materials' degradation and melting points, respectively.

In order to establish the PVT data on the injection molding machine 24, a melt compressibility test is conducted, which utilizes the injection end of the molding machine as a pressurization chamber. Melt compression is determined at varying pressures, over a range of temperatures and is easily correlated to a specific volume, the specific volume being defined as the volume to weight ratio. In implementing the procedure, a shot is generated and manually injected into a mold, which remains closed throughout the entire test. The solidified resin within the mold serves as a block, preventing the pressurized melt from escaping through the nozzle or into the mold. A shot, which may be approximately 75% of machine capacity, it plasticated and a predetermined hydraulic pressure is applied manually. Both temperature and screw travel (resin compression) are continuously monitored and recorded. It is important to note that application of hydraulic pressure in the manual mode secluded lock-up pressure to the injection carriage cylinders. The pressure on the melt, pushing against the solidified material in the mold, forces the injection carriage rearward, allowing melt to escape through the nozzle. Alleviation of this difficulty entails simultaneous manual application of hydraulic pressure to both the ram and injection cylinder.

The injection carriage is then retracted, and the pressurized shot is purged into a receptacle to be weighed. The previous steps are repeated at various pressures, such as 600 psi, 1,000 psi and 1,400 psi. The previous steps are repeated at various temperatures of processing interest, such as 320° F. for a linear low density polyethylene (LLDPE). Clearly, the lower and upper temperature range limits for the material are defined by its melting and degradation points, respectively. The specific volume is the volume of the compressed shot divided by the purged shot weight. Although most molding machines are subject to some degree of leakage through the non-return valve, thereby reducing melt volume and increasing apparent melt compression, the specific volume is relatively unaffected. A decrease in volume is offset by the accompanying decrease in purged shot weight.

The variables, specific volume and temperature, plotted as a function of isobars, results in a PVT diagram of the type typically used in the industry. Known curve fitting techniques are then utilized to find a general solution for the diagram, thereby enabling the constants for the equation of state to be calculated using standard mathematical techniques. FIG. 5 shows the PVT relationship for LLDPE discussed above.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and falls within the limits of the appended claims.

What is claimed is:

1. A method for determining PVT constants of a thermoplastic in an injection molding machine having a screw mounted in a barrel, said barrel having an injection outlet, said method comprising:
   (a) blocking the injection outlet of the barrel,
   (b) plasticating a shot of the material in the barrel and then pressurizing the shot in the barrel at a certain temperature and pressure by axially advancing the screw toward the blocked outlet,
   (c) measuring the volume of the pressurized shot by measuring the axial position of the screw,
   (d) purging the shot and weighing the purged shot,
   (e) calculating the specific volume as the ratio of the volume of the shot divided by the weight thereof,
   (f) repeating steps (b) through (e) with a plurality of different temperatures and pressures, and
   (g) assembling the plurality of specific volumes as a function of temperature and pressure.

2. The method of claim 1 wherein the step of assembling comprises preparing a plurality of plots of specific volume values as a function of temperature along pressure isobars.

* * * * *